(12) United States Patent
Liebler

(10) Patent No.: US 6,509,721 B1
(45) Date of Patent: Jan. 21, 2003

(54) BUCK REGULATOR WITH ABILITY TO HANDLE RAPID REDUCTION OF LOAD CURRENT

(75) Inventor: Jerome E. Liebler, North Plains, OR (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/940,366

(22) Filed: Aug. 27, 2001

(51) Int. Cl.⁷ .............................................. G05F 1/613
(52) U.S. Cl. ...................... 323/224; 323/283; 361/18; 361/93.9; 361/101
(58) Field of Search ................................ 323/224, 283, 323/266; 361/18, 93.9, 101, 92; 327/374, 376, 377

(56) References Cited

U.S. PATENT DOCUMENTS

| | | | | |
|---|---|---|---|---|
| 3,641,422 A | * | 2/1972 | Farnsworth et al. ........ | 323/224 |
| 4,200,813 A | * | 4/1980 | Van Schaik et al. ........ | 323/289 |
| 4,814,685 A | * | 3/1989 | Renger ........................ | 323/224 |
| 6,107,786 A | * | 8/2000 | Brown ........................ | 323/224 |
| 6,166,528 A | | 12/2000 | Rossetti et al. ............. | 323/283 |
| 6,188,206 B1 | * | 2/2001 | Nguyen et al. ............. | 323/222 |

\* cited by examiner

Primary Examiner—Shawn Riley
(74) Attorney, Agent, or Firm—Michael E. Schmitt

(57) ABSTRACT

A buck converter has an input circuit for receiving an input signal, a controller connected to and controlling the input circuit, a switch controllable by the controller for switching on/off, a current storage element connected to the input circuit and the switch, and an output voltage storage element connected to the current storage element for connecting in parallel with a load. In a charging phase, the controller causes (a) the input circuit to allow the input signal to pass through for provision to the load via the current storage element and (b) the switch to switch off (becoming an open circuit). In a discharging phase, the controller causes (a) the input circuit to decouple from the input signal and (b) the switch to switch on (become a short circuit), so that (c) current flows within a loop formed by the switch and the current storage element.

22 Claims, 3 Drawing Sheets

BUCK REGULATOR WITH ABILITY TO HANDLE RAPID REDUCTION OF LOAD CURRENT

BACKGROUND OF THE INVENTION

The invention generally relates to electronic devices, and more particularly to buck converters.

Buck converters are used to convert a higher voltage to a lower voltage suitable for use by, for example, a microprocessor. A conventional buck converter is disclosed in U.S. Pat. No. 6,166,528, issued to Rossetti et al. on Dec. 26, 2000, the disclosures of which are hereby incorporated by reference. Typically, a buck converter operates using a clock, whereby an inductor is charged during a first portion of a clock cycle ("charging phase") and operates as a current source during the second portion of the clock cycle ("discharging phase").

FIG. 1A, shows a typical buck converter 10, which includes transistors 14 and 18, a controller 20, an inductor 24 and a capacitor 28. Buck converter 10 operates by commencing the charging phase in response to a clock signal. During the charging phase, inductor 24, capacitor 28 and a load (not shown) connected at the output voltage Vout are coupled to an input voltage Vin. Meanwhile, the inductor current $i_L$ is monitored by controller 20. When $i_L$ peaks at a predetermined value, converter 10 is decoupled from the input voltage Vin and inductor 24 discharges its energy through the and capacitor 28. The inductor current $i_L$ rises and falls linearly with slope of $di_L/dt=(V_L/L)$, where $V_L$ is the voltage across the inductor. FIG. 1B shows Vin and $i_L$ signals in buck converter 10.

When there is a rapid reduction in load current demand, controller 20 simply waits while the current in inductor 24 discharges into capacitor 28 and the remaining load causing a rapid increase in the output voltage Vout. For example, microprocessors, such as Pentium® and Itanium® require voltages near 1.5 V and currents near 60 A and the current changes from 0 to 60 A and back in nanoseconds. Such an increase in Vout can result in serious damage to capacitor 28 and/or the load. Therefore, the capacitor must have a very large value to limit the voltage rise to a "safe" amount during such a rapid current surge. Capacitors with large values, however, are much more expensive and are among the most expensive components in a buck converter. This increases the overall cost of a buck converter.

Therefore, there is a need for a low cost buck converter without degrading its performance.

SUMMARY OF THE INVENTION

The present invention provides a low cost buck converter without compromising the performance. According to an embodiment of the invention, a buck converter comprises an input circuit for receiving an input signal, a controller connected to the input circuit for controlling the input circuit, a switch controllable by the controller for switching on/off, a current storage element connected to the input circuit and connected in parallel with the switch, and an output voltage storage element, connected to the current storage element, for connecting in parallel with a load.

According to one aspect of the embodiment of the invention, in a charging phase, the controller causes the input circuit to allow the input signal to pass through and be provided to a load via the current storage element. The controller also causes the switch to switch off and become an open circuit.

According to another aspect of the embodiment of the invention, in a discharging phase, the controller causes the input circuit to decouple from the input signal and causes the switch to switch on and become a short circuit, so that current flows within a loop formed by the switch and the current storage element.

According to a further aspect of the embodiment of the invention, the discharging phase occurs when the controller detects a rapid decrease in a load current flowing into the load. The discharging phase also occurs when the controller detects an over voltage condition at the output voltage storage element.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1A:
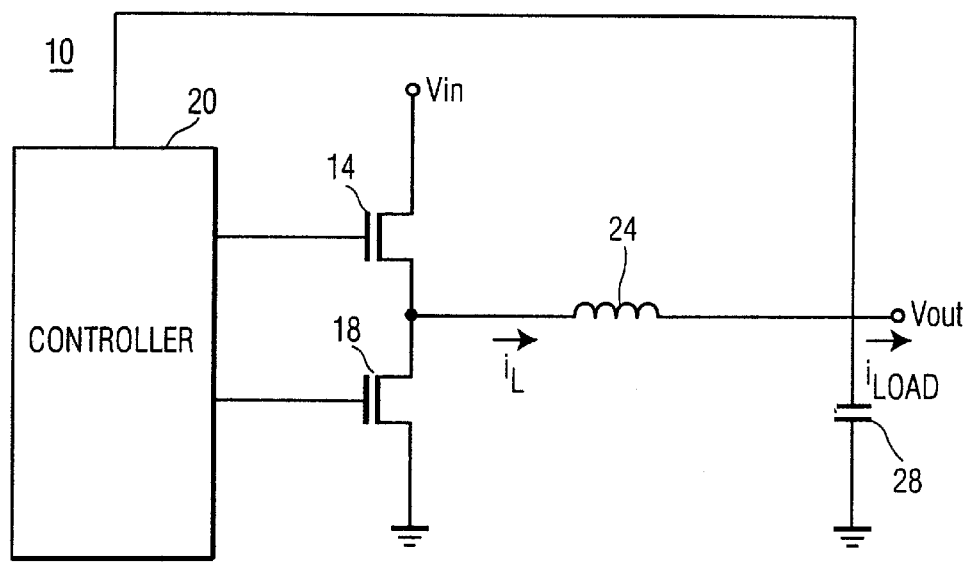
FIG. 1A shows a conventional buck converter.
Figure 1B:
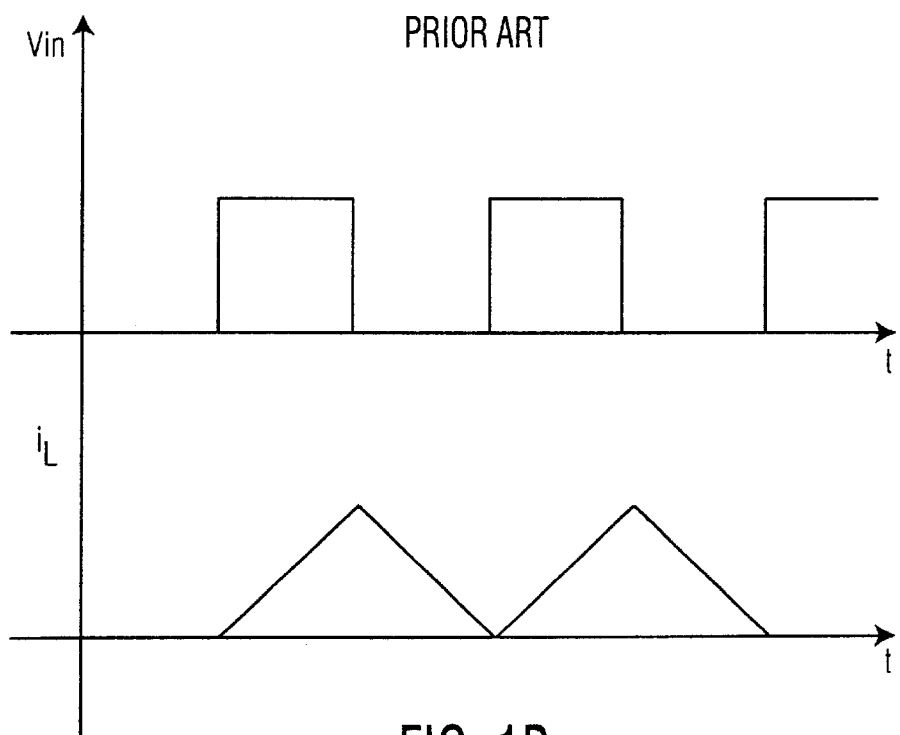
FIG. 1B shows various signals in the buck converter of FIG. 1.
Figure 2:
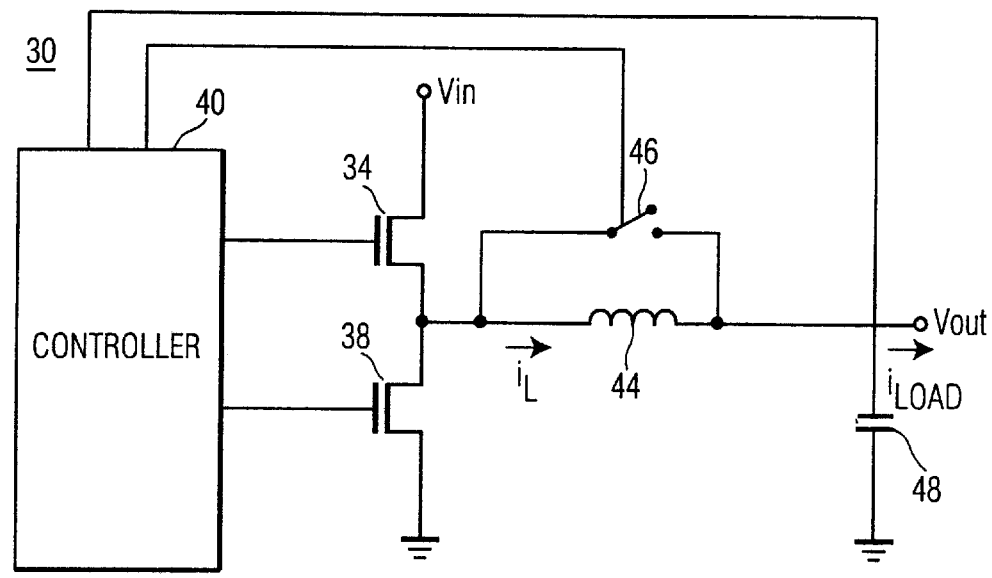
FIG. 2 shows a buck converter according to a first embodiment of the invention.

FIG. 2 shows a buck converter 30 according to a first embodiment of the present invention. Buck converter 30 includes MOS transistors 34 and 38 controlled by a controller 40 at their respective gates. In a specific embodiment, Vin is positive and both transistors 34 and 38 are N-type MOS transistors. Buck converter 30 also includes an inductor 44 connected to a switch 46 in parallel and a capacitor 48 connected between the output voltage Vout and the ground level. Switch 46 may be any suitable switching device preferably with very low on state resistance. Controller 40 controls switch 46 based on a detection of a rapid decrease in load current $i_{load}$ or an over voltage condition at the output Vout. An over voltage condition may be caused by a rapid decrease in load current $i_{load}$ as a result of disconnecting the load. As the load is disconnected, the load current $i_{load}$ will be rapidly decreased. Therefore, the inductor current $i_L$ will flow into capacitor 28 and cause Vout to increase beyond a predetermined level (e.g., 1.5V). An over voltage condition may also be caused by an increase in the inductor current $i_L$ during the charging phase while the load is present. When a rapid decrease of load current or an over voltage condition is detected by controller 40, the controller first turns off both transistors 34 and 38 then turns on switch 46.

In this first embodiment, during a charging phase, controller 40 turns on transistor 34 and turns off transistor 38 to allow inductor 44, capacitor 48 and the load (not shown) to be coupled to input voltage Vin, while switch 46 is kept open. As the inductor 44 is being charged, the inductor current $i_L$ increases, causing Vout to also increase. When controller 40 detects an over voltage condition or a rapid decrease in load current $i_{load}$ as a result of disconnecting the load, controller 40 turns off transistor 34 to decouple converter 30 from Vin to initiate a discharging phase. At this time, controller 40 also closes switch 46.

During the discharging phase, the inductor current $i_L$ is maintained with low losses within a closed loop formed by inductor 44 and switch 46 and does not flow into capacitor 48 or the load. This prevents capacitor 48 and/or remaining load from being damaged by over voltage. If the load is still present, the current will flow from capacitor 48 into the load. Once controller 40 detects that Vout has been reduced by the load current $i_{load}$ to a suitable level (e.g., 1.5V), controller 40 opens switch 46, allowing the current stored in inductor 44 to once again charge capacitor 48 and be supplied to the load. If controller 40 again detects either a rapid decrease in the load current or an over voltage condition at Vout, controller 40 will again close switch 46 but a lower current will flow within the inductor-switch loop. This cycle is repeated until the average inductor current $i_L$ is below the required load current $i_{load}$ after which the normal operation resumes, i.e., converter 30 operates alternately in charging and discharging phases.

During the above cycle, transistor 34 remains off and transistor 38 remain "undriven" but transistor 34 conducts through its internal diode whenever switch 46 is opened while current is flowing in the inductor.

In a specific example, Vin is 12 V and Vout is 1.2 V. Examining the rate of increase of the inductor current (where $V_L$ is Vin–Vout) versus the rate of decrease in the inductor current (where $V_L$ is Vout) shows: (Vin–Vout)/Vout=(12–1.2)/1.2=9. Therefore, since only increasing inductor current now affects the capacitor size needed, the required value of capacitor 48 is only about 1/10 of the original size. Thus, the cost of the capacitor is also reduced to about 1/10 of the original cost, resulting in significant savings.

Figure 3:
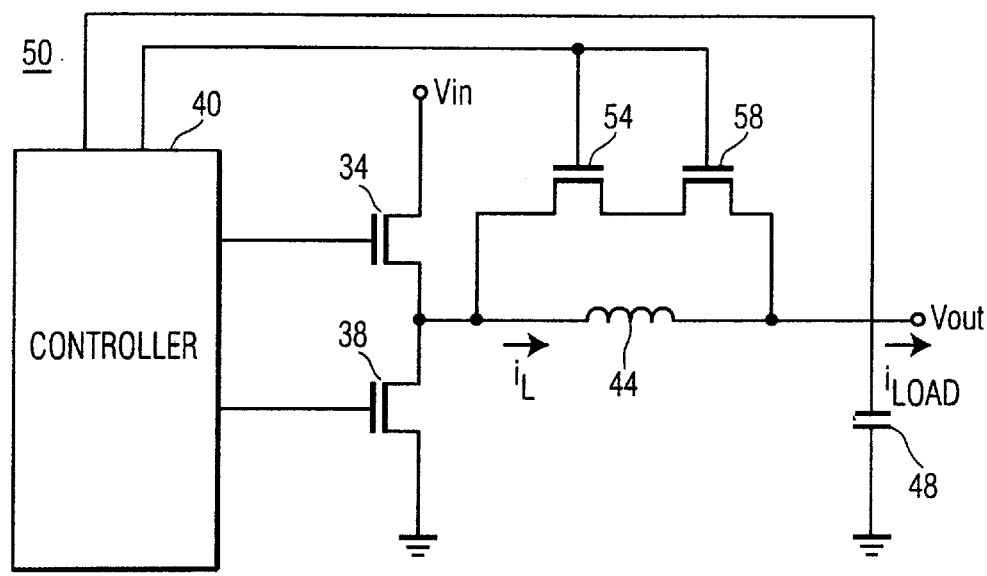
FIG. 3 shows a buck converter according to a second embodiment of the invention.

FIG. 3 shows a buck converter 50 according to a second embodiment of the invention. This embodiment is similar to the first embodiment in FIG. 2. In this embodiment, two MOS transistors (note two transistors are used to prevent the conduction of body diodes, regardless of the polarity of the voltage across the inductor, when the switch must be off) 54 and 58 are used in place of switch 46 in FIG. 2. The operation of converter 50 is that described above for converter 30 of the first embodiment. During a charging phase, both transistors 54 and 58 are turned off. During a discharging phase, both transistors 54 and 58 are initially turned on and form a closed loop with inductor 44 to maintain the inductor current within the loop. This prevents capacitor 48 from being overcharged.

In a discharging phase, controller 40 turns on or off both transistors 54 and 58 based on a detection of a rapid decrease in load current $i_{load}$ or an over voltage condition at the output Vout in a similar manner as controller 40 closes or opens switch 46 in FIG. 2, until the average inductor current $i_L$ is below the load current $i_{load}$ or Vout falls below a predetermined level.

While two transistors are used in this embodiment for practical reasons (the parasitic body diode), one transistor may also conceivably be used as the switch instead. The above embodiment is ideal for a situation where $i_{load}$ continuously and rapidly cycles through low-high values.

Figure 4:
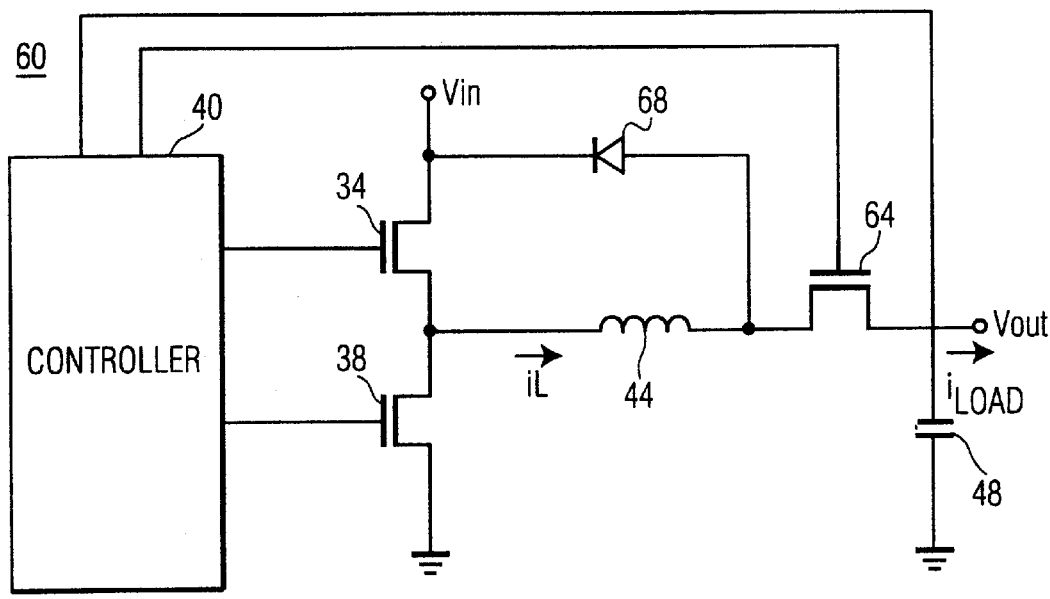
FIG. 4 shows a buck converter according to a third embodiment of the invention.

FIG. 4 shows a buck converter 60 according to a third embodiment of the present invention. As in FIG. 2, buck converter 60 includes transistors 34 and 38 controlled by a controller 40 at their respective gates. Buck converter 60 also includes an inductor 44 connected in series to a transistor 64, which has its gate controlled by controller 44. A diode 68 is connected between the input voltage Vin and one end of inductor 44, and a capacitor 48 is connected between the output voltage Vout and the ground level. Diode 68 is preferably a Schottky diode which has the modest losses and reasonable cost. Diode 68 may alternatively be implemented by an active rectifier, using a power MOSFET for the lowest losses but at higher cost.

During a charging phase, controller 40 turns on transistors 34 and 64 and turns off transistor 38 to allow inductor 44, capacitor 48 and the load to be coupled to Vin. Diode 68 is reverse biased and acts an open circuit in the charging phase. If the load is disconnected from converter 60, a rapid decrease in $i_{load}$ will occur. When controller 40 detects a rapid decrease in $i_{load}$ or an increase in Vout above a predetermined level (e.g., 1.5 V) in a discharging phase, controller 40 turns off transistor 64, which then acts as an open circuit. This prevents capacitor 48 from being overcharged. Current then flows within the loop formed by transistor 34, inductor 44 and diode 68. The current within the loop is rapidly discharged in diode 68. When the load is re-connected to the converter, a new charging phase will begin and controller 40 will turn on transistor 64 to allow Vin to be connected to converter 60 in a manner as described above.

The above embodiment is ideal for a situation where $i_{load}$ or Vout cycles through low-high values less frequently.

Figure 5:
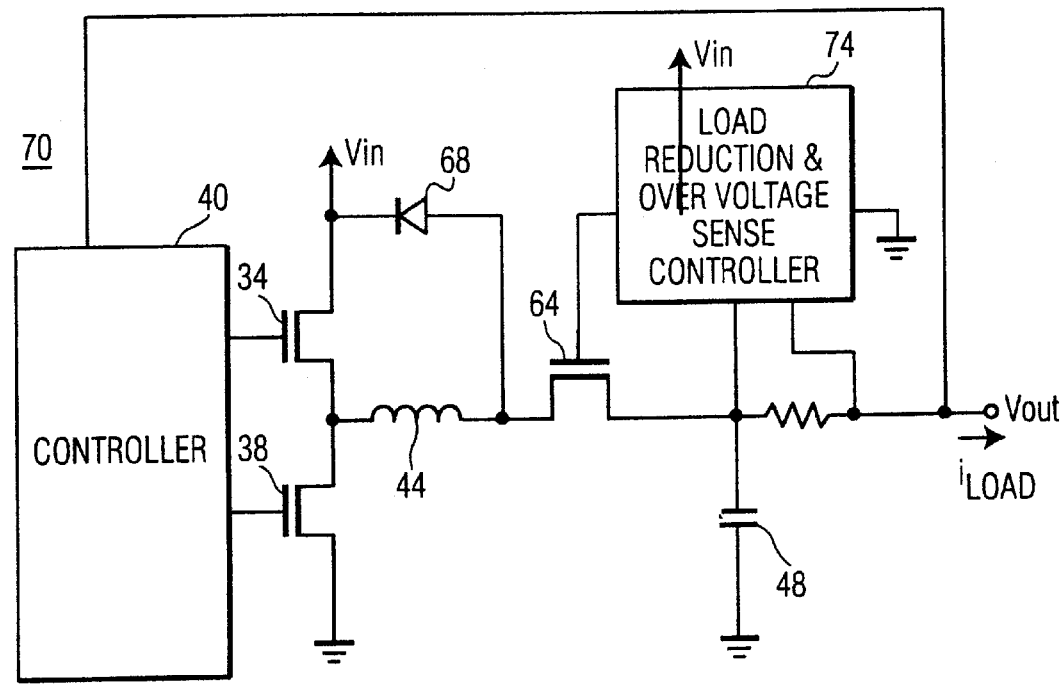
FIG. 5 shows a buck converter according to a fourth embodiment of the invention.

FIG. 5 shows a buck converter 70 according to a fourth embodiment of the invention. This fourth embodiment is a variation of the third embodiment of FIG. 4. This embodiment allows the control of transistor 64 by a load reduction and over voltage sense controller 74 to be separated from controller 40 driving transistors 34 and 38. This may be advantageous in that a wide range of choices of relatively mature controllers for transistors 34 and 38 may be adapted to be incorporated in this invention with a relatively simple addition.

The invention may also be implemented by modifying a non-synchronous buck regulator, such as a Philips SAPFET, which is available from Philips Semiconductors, Inc., Sunnyvale, Calif.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A buck converter, comprising:
   an input circuit for receiving an input signal;
   a controller connected to the input circuit for controlling the input circuit;
   a switch controllable by the controller for switching on/off;
   a current storage element connected to the input circuit and connected in parallel with the switch; and
   an output voltage storage element, connected to the current storage element, for connecting in parallel with a load.

2. The converter of claim 1, wherein in a charging phase, the controller causes the input circuit to allow the input signal to pass through and be provided to a load via the current storage element, and wherein the controller also causes the switch to switch off and become an open circuit.

3. The converter of claim 2, wherein in a discharging phase, the controller causes the input circuit to decouple from the input signal and causes the switch to switch on and become a short circuit, so that current flows within a loop formed by the switch and the current storage element.

4. The converter of claim 3, wherein the discharging phase occurs when the roller detects a rapid decrease in a load current flowing into the load.

5. The converter of claim 3, wherein the discharging phase occurs when the roller detects an over voltage condition at the output voltage storage element.

6. The converter of claim 1, wherein the switch includes two MOS transistors connected to each other in series.

7. A buck converter, comprising:

an input circuit for receiving an input signal;

a controller connected to the input circuit for controlling the input circuit;

a switch controllable by the controller for switching on/off;

a current storage element connected to the input circuit and connected in parallel with the switch; and an output voltage storage element, connected to the current storage element, for connecting in parallel with a load;

wherein in a charging phase, the controller causes the input circuit to allow the input signal to pass through and be provided to a load via the current storage element, and wherein the controller also causes the switch to switch off and become an open circuit;

wherein in a discharging phase, the controller causes the input circuit to decouple from the input signal and causes the switch to switch on and become a short circuit, so that current flows within a loop formed by the switch and the current storage element.

8. The converter of claim 7, wherein the discharging phase occurs when the controller detects a rapid decrease in a load current flowing into the load.

9. The converter of claim 8, wherein the discharging phase occurs when the controller detects an over voltage condition at the output voltage storage element.

10. A buck converter, comprising:

input means for receiving an input signal;

control means connected to the input means for controlling the input means;

switch means controllable by the control means for switching on/off;

current storage means connected to the input means and connected in parallel with the switch means; and output voltage storage means, connected to the current storage means, for connecting in parallel with a load.

11. The converter of claim 10, wherein in a charging phase, the control means causes the input means to allow the input signal to pass through and be provided to a load via the current storage means, and wherein the control means also causes the switch means to switch off and become an open circuit.

12. The converter of claim 10, wherein in a discharging phase, the control means causes the input means to decouple from the input signal and causes the switch means to switch on and become a short circuit, so that current flows within a loop formed by the switch means and the current storage means;

wherein the discharging phase occurs when the controller detects a rapid decrease in a load current flowing into the load;

wherein the discharging phase occurs when the controller detects an over voltage condition at the output voltage storage element.

13. A buck converter, comprising:

an input circuit having an input terminal for receiving an input signal;

a controller connected to the input circuit for controlling the input circuit;

a current storage element connected to the input circuit;

a switch controllable by the controller for switching on/off and connected to the current storage element in series;

a rectifying element connected between the input terminal of the input circuit and point between the current storage element and the input circuit; and an output voltage storage element, connected to the switch, for connecting in parallel with a load.

14. The converter of claim 13, wherein during a charging phase, the controller allows an input signal to pass through the input circuit and be provided to a load via the current storage element and the switch.

15. The converter of claim 14, during a discharging phase, the controller causes the switch to be turned off, so that current flows within a loop formed by a portion of the input circuit, the current storage element and the rectifying element.

16. The converter of claim 15, wherein the discharging phase occurs when the controller detects a rapid decrease in a load current flowing into the load.

17. The converter of claim 15, wherein the discharging phase occurs when the controller detects an over voltage condition.

18. A computer system, comprising:

a memory;

a processor connected to the memory; and a buck converter for converting a higher voltage to a lower voltage suitable for use by the processor, the converter including:

an input circuit for receiving an input signal, a controller connected to the input circuit for controlling the input circuit, a switch controllable by the controller for switching on/off, a current storage element connected to the input circuit and connected in parallel with the switch, and an output voltage storage element, connected to the current storage element, for connecting in parallel with a load.

19. The system of claim 18, wherein in a charging phase, the controller causes the input circuit to allow the input signal to pass through and be provided to a load via the current storage element, and wherein the controller also causes the switch to switch off and become an open circuit.

20. The system of claim 19, wherein in a discharging phase, the controller causes the input circuit to decouple from the input signal and causes the switch to switch on and become a short circuit, so that current flows within a loop formed by the switch and the current storage element.

21. The system of claim 20, wherein the discharging phase occurs when the controller detects a rapid decrease in a load current flowing into the load.

22. The system of claim 20, wherein the discharging phase occurs when the controller detects an over voltage condition at the output voltage storage element.

* * * * *